(12) United States Patent
Barthel et al.

(10) Patent No.: US 9,731,662 B2
(45) Date of Patent: Aug. 15, 2017

(54) ASSEMBLY FOR A VEHICLE

(71) Applicants: Joachim Barthel, Essen (DE); Stephan Wietkamp, Muenster (DE)

(72) Inventors: Joachim Barthel, Essen (DE); Stephan Wietkamp, Muenster (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 154 days.

(21) Appl. No.: 14/737,139

(22) Filed: Jun. 11, 2015

(65) Prior Publication Data
US 2015/0360619 A1    Dec. 17, 2015

(30) Foreign Application Priority Data

Jun. 13, 2014 (DE) .................. 10 2014 108 378
Jul. 11, 2014 (DE) .................. 10 2014 109 738

(51) Int. Cl.
*B60R 11/04* (2006.01)
*B60R 1/12* (2006.01)

(52) U.S. Cl.
CPC ....... *B60R 11/04* (2013.01); *B60R 2001/1253* (2013.01)

(58) Field of Classification Search
CPC .................. B60R 11/04; B60R 2001/1253
See application file for complete search history.

(56) References Cited

U.S. PATENT DOCUMENTS

| | | | |
|---|---|---|---|
| 2006/0171704 A1* | 8/2006 | Bingle | B60R 11/04 396/419 |
| 2009/0309971 A1* | 12/2009 | Schuetz | B60R 11/04 348/148 |

FOREIGN PATENT DOCUMENTS

| | | |
|---|---|---|
| DE | 102 04 764 A1 | 8/2003 |
| DE | 10 2006 023103 A1 | 11/2007 |
| DE | 10 2006 039192 A1 | 2/2008 |
| EP | 1 529 688 A1 | 5/2005 |
| EP | 2 508 393 A1 | 10/2012 |
| EP | 2 525 029 A2 | 11/2012 |

OTHER PUBLICATIONS

European Search Report of Related European Application No. EP 15 16 7497 dated Nov. 16, 2015.

* cited by examiner

*Primary Examiner* — Christopher Findley
(74) *Attorney, Agent, or Firm* — Fay Sharpe LLP

(57) ABSTRACT

A solution that offers increased comfort for the user and increases the value of the vehicle is obtained with an assembly for a vehicle, having a carrier housing, which has a through-hole, a drive unit, which is attached to the carrier housing, a camera unit, which can move between a standby position and an active position and a protective lid, which can move between an open position and a closed position. An actuating element is movably coupled to the drive unit and forces the protective lid into its open position when the vehicle is driven in reverse and the camera unit is in the active position. The camera unit assumes a collision monitoring position when the vehicle is being driven forwards, in which position the protective lid is disposed in its closed position, and in which the camera unit is disposed at a monitoring opening formed in the protective lid, for filming the following or preceding traffic.

16 Claims, 9 Drawing Sheets

ASSEMBLY FOR A VEHICLE

BACKGROUND

The invention relates to an assembly, in particular a camera assembly, for a motor vehicle, wherein the assembly comprises a carrier housing, which is disposed in an opening in an exterior paneling of the vehicle, and which has a through-hole, a drive unit, which is attached to the back surface of the carrier housing, a movably supported camera unit, which can be moved by means of the drive unit between at least a standby position and an active position, in which at least the lens of the camera unit protrudes out of the through-hole in the carrier housing and which is oriented at a slant to the movement direction of the camera unit, a protective lid movably supported on the carrier housing, which can move between a closed position, in which it closes the through-hole in the carrier housing, and in which the camera is disposed, seen from the outside, behind the protective lid, and an open position, in which it opens the through-hole in the carrier housing, wherein an actuating element, movably coupled to the drive unit, is provided, which forces the protective lid into the open position when the vehicle is driven in reverse and when the camera unit is in the active position.

In order to back into a parking space safely, observation of the rearward space behind the vehicle is essential. The rearview mirrors only provide the vehicle driver with an insufficient range of observation because the rearview mirrors do not enable vision of the so-called blind spot. By means of a camera unit, images are displayed on a monitor disposed in the vehicle interior, including images that cannot be seen by a vehicle driver with the rearview mirrors, such that the vehicle driver has a nearly complete overview of the region in which the vehicle is to move when backing into a parking space. Devices having a camera unit that serves to record images of the region outside a vehicle are already known from the prior art. These devices comprise a housing, in which the camera is movably accommodated between a retraction position and an operating position. By way of example, these camera units are used as an aid for parking vehicles, as indicated above. If, for example, the vehicle is shifted into reverse, the camera is moved from the retraction position into the operating position, wherein the camera unit protrudes, at least in part, out of the housing. As a result, the region behind the motor vehicle is recorded in images, and displayed on a monitor for the driver. Once the backing up is complete, and the driver shifts out of the reverse gear, the camera can again pivot out of the operating position into the retraction position.

An assembly of the type specified in the introduction is known, for example, from DE 102 04 764 A1. The placement of the camera unit behind a protective element, or a protective lid, when in the inactive position, has the advantage that the camera unit, and in particular the lens of the camera unit, are protected from dirt and moisture. With the assembly corresponding to DE 102 04 764 A1, the camera unit is located behind an opening in the body panel of the vehicle, wherein the opening is closed by the pivotable protective lid when the camera unit is in the inactive position. In order to record images, the camera unit is then displaced linearly, by means of a motor, via a carriage, wherein the protective lid is pivoted upward via a push rod, which is connected to the pivotable protective lid and the displaceable camera unit, as a result of the linear displacement of the camera unit, such that the opening is opened, and the camera unit is then driven, at least in part, out of the opening, in order to record images. This type of known camera assembly is structurally very complex, and thus, due to the complex displacement and pivotal mechanisms, is prone to malfunction. Furthermore, the known assembly no longer fulfills the increasing demands for comfort from the customer in the world of today, and furthermore, exhibits only limited functionality of a view of the rearward space behind the vehicle visualized by the driver when backing into a parking space.

EP 1 529 688 A1 shows a device of a different type, where the camera is non-rotatably disposed on the back surface of a hinged protective element. When the protective element is pivoted upward, the camera is pivoted therewith. The camera moving together therewith in this manner increases, in a disadvantageous manner, the mass of the protective element, for which reason greater torques are necessary for executing its hinged motion.

The object of the invention is to create a solution that provides an assembly for a vehicle in a simple constructive manner, which is inexpensive to manufacture, and with which the disadvantages specified above are eliminated. In particular, an assembly should be provided that offers the user increased comfort and increases the value of the vehicle.

BRIEF SUMMARY

With one assembly of the type indicated in the introduction, the object is achieved according to the invention in that the camera unit assumes a collision monitoring position when the vehicle is moving forwards, in which the protective lid is disposed in its closed position, and in which the camera unit is disposed at a monitoring opening formed in the protective lid, for filming the traffic behind or in front of the vehicle. The lens of the camera unit is oriented thereby in the direction of movement of the camera when in the collision monitoring position, and not tilted, as is the case when in the active position. The monitoring opening formed in the protective lid is a through-hole having a transparent cover, in order that the camera unit disposed behind the protective lid has an unobstructed view outward, and nevertheless, dirt from the exterior is unable to enter.

Advantageous and practical designs and further developments of the invention can be derived from the dependent Claims.

An assembly for a vehicle is made available by the invention, which is distinguished by a functional construction. An assembly of this type, for a vehicle, having a movably disposed camera unit, has a simple and cost-effective design, and ensures, when the protective lid is in the closed position, a secure protection of the camera unit from external effects, such as dirt, shocks, or impacts, for example. Because the camera unit, in accordance with the invention, can also assume a collision monitoring position, in which the protective lid is disposed in its closed position, and nevertheless, the camera lens can film traffic through the monitoring opening, the camera unit serves not only as a parking aid, but also as a component of an anticipatory sensor system (pre-crash sensor) for an occupant protection system, which recognizes potentially dangerous situations before an accident occurs. The early detection makes it possible to avoid an impending crash, or at least reduce the impact thereof, through engaging the brake, drive, and/or steering system, by arranging the seats and headrests in a position optimized for a crash, and by tightening, the seatbelts. While when in the active position, at least the lens of the camera unit protrudes out of the through-hole of the carrier housing, and is oriented such that it is tilted in relation to the direction of movement for the camera unit, in order to visualize the region, as well as the ground in front of the bumper of the vehicle, for the driver, when the camera unit is in the collision monitoring position, the lens of the camera unit is not tilted, but rather, is disposed such that it is directed substantially horizontally, in order to film the traffic behind the vehicle (or in front of the vehicle, in the case of a front-mounted camera). As a result of the assembly according to the invention, the functionality is increased, because the assembly can now be used as both a parking aid as well as a protection system for the occupants of the vehicle. The monitoring opening can have a transparent plate, such that the camera unit is securely disposed behind the protective lid.

In order to increase the comfort and functionality of the assembly, the design of the invention provides that the camera unit can be moved, moreover, between a retraction position and a comfort position, serving to illuminate the region in front of the vehicle, in which the protective lid is disposed in its open position, wherein the camera unit is disposed further away from protective lid when in the retraction position than when in the collision monitoring position, and wherein the camera unit is disposed between the collision monitoring position and the retraction position when in the comfort position. By way of example, the drive unit is designed such that it can move the camera unit sequentially between an active position, a collision monitoring position, a comfort position and a retraction position. In the comfort position, the camera unit is not extended and the protective lid is not disposed in its open position, such that lighting elements, which illuminate the region in front of the carrier housing, can be disposed on the inside of the protective lid, or inside the carrier housing. The comfort position can be initiated, for example, by a control device, which receives a corresponding signal from a user approaching the vehicle. In this manner, the lighting, or the lighting for the region in front of the vehicle as well, can provide the user with a certain orientation when it is dark, or it can facilitate finding the vehicle in a parking structure. The lighting system can, however, also provide the user with information regarding the status of his interaction with the locking and opening system of the vehicle, such that the user can determine, through various configurations of the lights being switched on, that the door, for example, is unlocked, or a hatch will open automatically.

It is provided, in the design of the assembly for a vehicle according to the invention, that the comfort position can only be assumed by the camera unit if it has already been moved to the retraction position. A movement of the camera unit into a position that is disposed behind the comfort position causes a mechanical displacement of the assembly, by means of which it is possible for the protective lid to be disposed in its open position, in which the camera, however, is not moved outward to its active position, but instead, is located in the retracted comfort position in the carrier housing with respect to the active position.

A structurally particularly simple possibility for implementing the desired movement mechanics and the movement coupling of the camera unit and the protective lid is provided in the design of the invention in that the actuating element is designed as a control pin on the camera unit, and a push rod, which is functionally connected to the protective lid and movably supported on the carrier housing, has a first contact surface, wherein, when the camera unit moves from the collision monitoring position to the active position, the control pin rests against the first contact surface, and pushes the first contact surface toward the through-hole, such that the push rod forces the protective lid into its open position.

In order to avoid having an additional drive unit, in order that the protective lid can still be disposed, nevertheless, in its open position for different positions of the camera unit, the invention provides, in the form of a mechanical design, that a spacer having a second contact surface is rotatably attached to the longitudinal end of the push rod facing away from the protective lid, wherein the second contact surface is disposed on the side of the first contact surface facing away from the protective lid, and at a spacing to the first contact surface, wherein the actuating element designed as the control pin rests against the second contact surface of the spacer and pushes the second contact surface toward the through-hole, such that the push rod forces the protective lid into its open position, when the camera unit is in the comfort position and in the retraction position. The spacer thus serves as a type of extension, which nevertheless, still allows the camera unit, despite its further retracted position, to actuate the push rod and force it toward the protective lid, such that the push rod pushes the protective lid open, regardless of whether the camera unit is disposed such that it is retracted into the carrier housing. Because the push rod opens the protective lid in both the comfort position and in the active position, the drive unit is only needed for the camera unit, and a drive for opening the protective lid is no longer necessary.

In order to implement the desired movement mechanics, in order that the camera unit pushes the protective lid open, but does not protrude from the through-hole, it is provided in the design that, with a movement of the camera unit away from the protective lid, from the collision monitoring position to the retraction position, the control pin pushes and pivots the spacer out of its movement path such that the control pin ends up on the side of the second contact surface facing away from the protective lid, and rests against this second contact surface. When the control pin rests against the second contact surface, a movement of the camera unit toward the protective lid then results in it being at all possible to assume the comfort position, that is, that the protective lid is disposed in the open position and the camera unit is disposed in a retracted position in the carrier housing.

In order to again bring the control pin into a position in which it no longer rests against the second contact surface (for the comfort position) but instead, rests against the first contact surface (for the active position and the collision monitoring position), in order that the camera unit can again assume its active position, for example, as a parking aid, it is provided by the invention in a further design that, with .a movement of the camera unit toward the protective lid, from the comfort position to the collision monitoring position, a housing guide guides a return pin attached to the spacer such that the second contact surface moves the spacer out of the movement path of the control pin, and the control pin comes to rest against the first contact surface.

The possibility, that the return pin moves the second contact surface of the spacer out of the movement path of the control pin, is associated with an undesired noise development, because the spacer swings back and its second contact surface is no longer pushed against when the spacer has passed by the return pin, by means of which the push rod coupled to the spacer is forced back by the protective lid, because the protective lid itself is, in turn, spring loaded, and is subjected to a force by a spring element, toward its closed position. In order to prevent this noise, the invention provides, in a further design, that a drive device is movably coupled to the spacer, and its second contact surface is moved out of the movement path of the control pin when the camera unit is moved toward the protective lid, from the comfort position to the collision monitoring position. The movement of the second contact surface of the spacer, from the movement path of the control pin and into its movement path thus occurs in a controlled manner, by means of which undesired noises can be prevented, because abrupt contact between components no longer occurs.

A structurally particularly beneficial possibility for implementing a silent movement of the spacer is provided in the design of the invention in that the drive device is attached to the carrier housing or the camera housing, and a complement connects the drive device with the spacer such that the spacer can be pivoted about a movement pin of the push rod.

In a further design of the invention, it is provided that the drive device, which can be a servomotor or a solenoid, is coupled in a controlling manner to the drive of the drive unit for the camera unit. The control coupling places the drive device in operation, depending on the position of the camera unit and/or the control pin, and is designed such that it then pivots the spacer and its second contact surface out of the movement path of the control pin when the camera unit moves from the comfort position into the collision monitoring position, wherein the camera unit itself need not be disposed in the positions, but rather, must only pass through these positions.

For the protection of, and to guide, the camera unit, the invention provides, in a further design, that an accommodating housing attached to the carrier housing extends in the extension of the through-hole, in which accommodating housing the camera unit is supported such that it can be displaced between its active position and standby position. The carrier housing and the accommodating housing can be produced thereby as an integrated unit, although this is not necessary for implementing the advantages according to the invention.

A structurally particularly simple possibility for guiding the movement of the camera unit is provided in the design of the invention in that the camera unit has at least one pin element, which is movably guided in a complementary guide groove in the accommodating housing. The guidance of the camera unit basically occurs in the manner of a slotted guide, wherein the guidance can be designed such that the movement of the camera unit is guided linearly. It is of particular advantage when the pin element is also the control pin.

The invention provides in a further design that the collision monitoring position or the retraction position is the standby position. The decision in this regard, as to which of the two positions is capable of reducing the power consumption of the drive to a minimum, is difficult. However, for reasons of comfort, the assembly would be configured and designed such that the standby position, when the vehicle is parked, is also the retraction position. This is because the camera device can only move directly to the comfort position from the retraction position, and not from the collision monitoring position, which in the majority of cases is the position that is of significance prior to the vehicle driver getting into the vehicle, in order, for example, to provide the vehicle driver with a certain orientation by means of lighting the area in front of the assembly in conjunction with the comfort position.

A particularly space-saving drive for the camera device, occupying a limited amount of structural space, can be implemented in that the drive unit drives a worm screw extending in the direction of movement for the camera unit, which is connected in an articulated manner, as well as movably coupled, to a first end of a lever element, wherein the second end of the lever element is connected in an articulated manner to the camera unit. The articulated connection enables a pivoting of the camera unit thereby, in particular when the camera unit is disposed in its active position, with its lens tilted in relation to the direction of movement.

In order to return and retain the push rod in its home position, from which it does not force the protective lid into the open position, a mechanically simple possibility is defined in the design of the invention, in that the push rod can be moved against the force of a spring element toward the carrier housing.

According to a further design of the assembly according to the invention, the protective lid has a printed circuit board, which has a light source for lighting the surrounding area when the protective lid is open and/or for lighting a vehicle make emblem attached to the outside of the protective lid. The printed circuit board can make it possible to light the exterior of the vehicle in the dark, or it can provide a backlighting for the vehicle make emblem, for which purpose, in addition to the vehicle make emblem and the printed circuit board having the light source, a light distribution device may also be provided on the handle designed in the shape of a cover.

It is provided in the design of the invention that an electrically conductive spring element is disposed between the protective lid and the carrier housing, which electrically connects the printed circuit board to a vehicle-side conductive element, and which applies a return force, forcing the protective lid into the closed position. As a result of the spring element, a drive element for returning the protective lid to its closed position is not necessary, such that the costs for the assembly can be reduced on the whole. The electrically conductive spring element serves to transfer power for supplying current and/or for transmitting data between the vehicle and the printed circuit board. As a result, it is possible to increase the functionality of the protective lid and the assembly on the whole, because the protective lid can then exhibit a lighting possibility or a sensor for detecting the approach of a user, for example. The vehicle-side conductive element can, for example, be a plug, in the simplest form, which is plugged into a socket formed on the housing, such that the vehicle-side plug is then connected to the printed circuit board via the electrically conductive spring element.

Lastly, in a further development, the invention provides that the protective lid is a handle for opening a lid of the vehicle, and the printed circuit board has a proximity sensor for detecting the approach of a body part of the user, wherein the handle is pivotably supported on the carrier housing such that it can be pivoted from the closed position to the open position in that it is possible for a user to grasp the handle from behind in order to actuate it. With this design, the handle serves as an actual handle only in an emergency, because the handle, with the printed circuit board integrated therein, having the proximity sensor, primarily serves to detect an approach of a body part of a user, in order to then open the lid without contact, when the body part is close enough to the handle, and additionally, a corresponding signal has been transmitted to the motor vehicle from a valid ID provider. It is furthermore advantageous when the proximity sensor is designed as a capacitive sensor. As an alternative to the capacitive sensor, an inductive sensor can also be used. Both types of sensors are available on the market, and provided with appropriate circuitry guidelines. Capacitive sensors, furthermore, can be formed by metal surfaces, which are coupled with suitable charging electronics. The detection range of the sensor extends through the components in front of it, oriented toward the user, and senses, without contact, the approach of a user body part. A control and evaluation circuitry is coupled to the proximity sensor, which can be disposed on the printed circuit board. The control and evaluation circuitry controls the, either capacitive or inductive, proximity sensor in the technically intended manner. Accordingly, the printed circuit board can have a control and evaluation circuitry coupled to the proximity sensor.

The assembly according to the invention can thus offer a novel combination, with which a vehicle make emblem is optically distinguished and illuminated, with which a protective lid can also function as a handle, with which the handle enables access to a vehicle without a key, as a result of a sensor or receiver accommodated therein, and with which the camera unit forms not only an aid in driving in reverse, but also protection for the occupants of the vehicle by means of its pre-crash function. The invention thus provides an assembly comprising a carrier housing that can be attached to a lid of a vehicle, and a protective lid, pivotably supported on the carrier housing, which can also function as a handle, wherein the protective lid, designed as a cover, can be pivoted from its closed position to an open position. In the open position, it is possible to grasp the handle from behind, in the case in which the protective lid functions as a handle. The protective lid, or the handle, respectively, has a printed circuit board, which is connected to a vehicle-side conductive element via an electrically conductive spring element, in order to be able to supply power to the printed circuit board, and to exchange data between the printed circuit board and a vehicle-side module. The printed circuit board can be designed, thereby, to illuminate the protective lid, or handle, respectively, or a vehicle make emblem attached to the outside thereof, and/or to detect the approach of a user body part, in order to open the lid without contact. The assembly according to the invention accordingly offers an innovative combination of optical identification and actuation. The proximity sensor, in turn, combined with the lighting function, enables a particularly reliable and user-friendly access, wherein the camera unit serves as an aid for parking and a component of an occupant protection system.

It is to be understood that the features specified above and still to be explained below can be used not only in the respective combinations given herein, but also in other combinations or in and of themselves, without abandoning the scope of the present invention. The scope of the invention is defined only by the Claims.

BRIEF DESCRIPTION OF THE DRAWINGS

Further details, features and advantages of the subject matter of the invention can be derived from the following description in conjunction with the drawings, in which, by way of example, a preferred exemplary embodiment of the invention is depicted. In the drawings.

DETAILED DESCRIPTION

Figure 1:
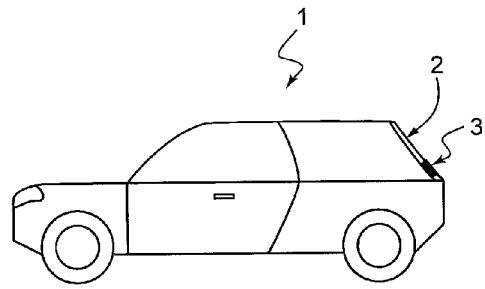
FIG. 1 shows a side view of a motor vehicle having an assembly according to the invention.

A vehicle 1 in the form of a passenger car is depicted by way of example in FIG. 1, which, in the example, has a lid, or hatchback 2, respectively, on which an assembly 3 according to the invention is attached. The assembly 3 is disposed in an opening 4 in the exterior paneling of the vehicle 1, and attached there, as is shown in particular in FIG. 2. The assembly 3 is depicted in a front view in FIG.

Figure 3:
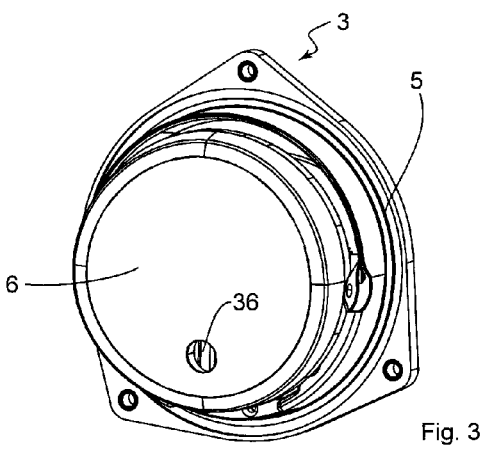
FIG. 3 shows a perspective view of the assembly, without exterior paneling, wherein the protective lid is disposed, however, in a closed position.
Figure 4:
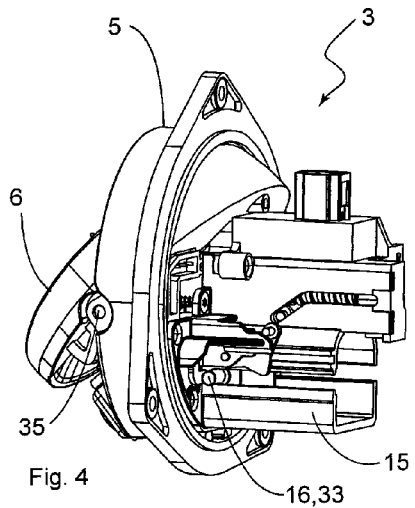
FIG. 4 shows a perspective side view of the assembly according to the invention.
Figure 8:
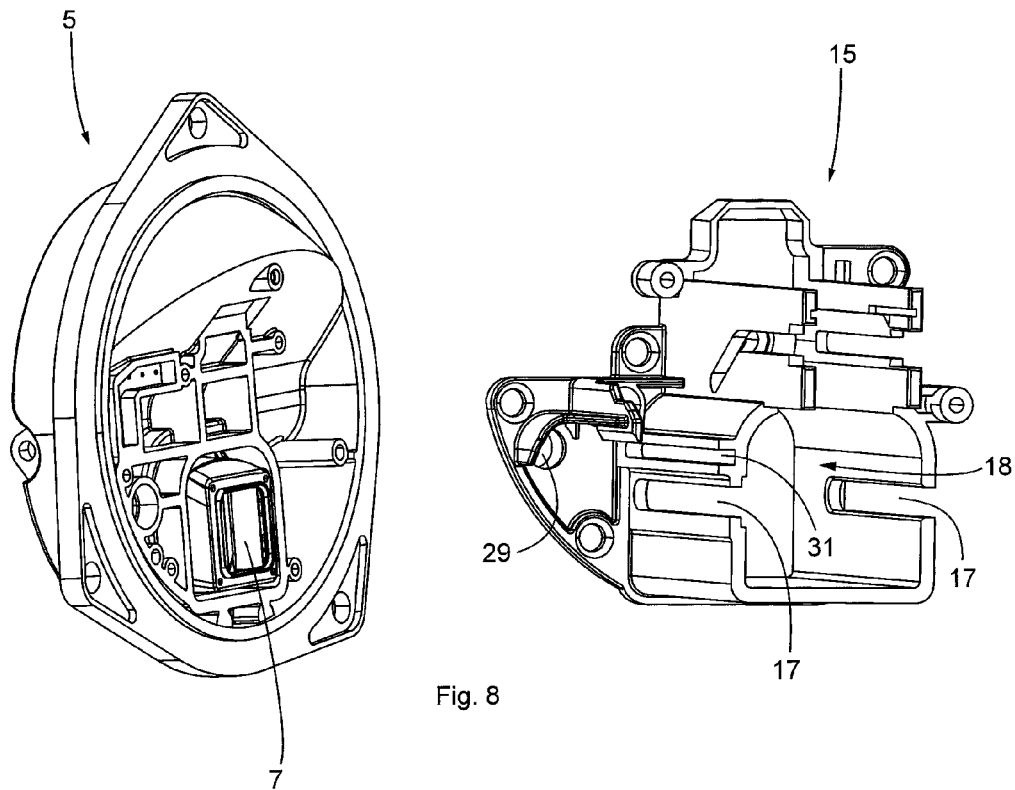
FIG. 8 shows an enlarged, perspective rear view of the housing component of the assembly according to the invention.

3 and in a side view in FIG. 4. The assembly 3 comprises a carrier housing 5, having a cylindrical, or shell-like shape, respectively. A protective lid 6 is movably supported on the carrier housing 5, between a closed position (see FIG. 3) and an open position (see FIGS. 2 and 4). In the closed position, the protective lid 6 closes a through-hole 7, which can be seen more clearly in FIG. 5, that extends from the front surface of the carrier housing 5, through the carrier housing 5, to the back surface, which is shown in FIG. 8. When the protective lid 6 is in its open position, however, it opens the through hole 7.

Figure 5:
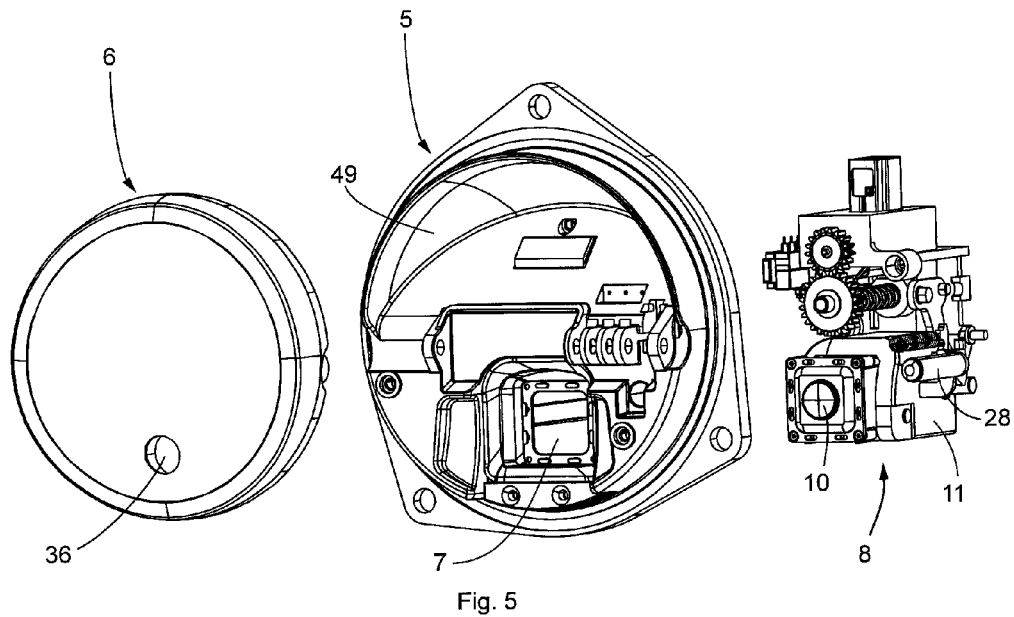
FIG. 5 shows a perspective exploded view of the assembly from FIG. 4.
Figure 9:
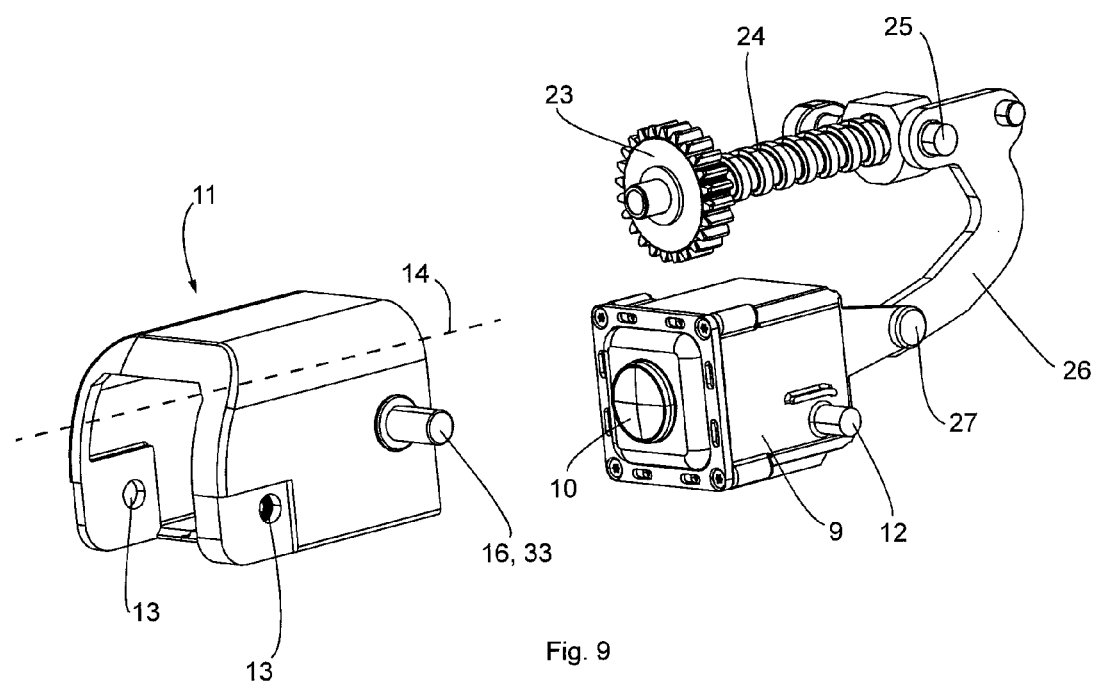
FIG. 9 shows an exploded view of the camera unit and a part of the drive unit.

The assembly 3 furthermore comprises a movably supported camera unit 8, which is depicted in greater detail, by way of example, in FIG. 5, and in particular in FIG. 9. The camera unit 8 has a camera 9 with a lens 10, which is placed in a camera housing 11. The camera housing 11 is formed by two parts in the depicted exemplary embodiment, as well as being designed in the manner of a shell, such that the camera 9 is enclosed by the two shell-like parts of the camera housing 11. In FIG. 9, the camera 9 is depicted separately from the camera housing 11. The camera has pivot pins 12 protruding laterally, which are supported in corresponding pivot bearings 13 (see FIG. 9) of the camera housing 11, and the enable a pivoting of the camera 9 inside the camera housing 11, as is shown, for example, in FIG. 16. In the pivoted position, the camera unit 8, or the camera 9, respectively, assumes an active position, in which the lens is tilted in relation to the horizontal axis 14 (see FIG. 9) of the camera housing 11.

Figure 2:
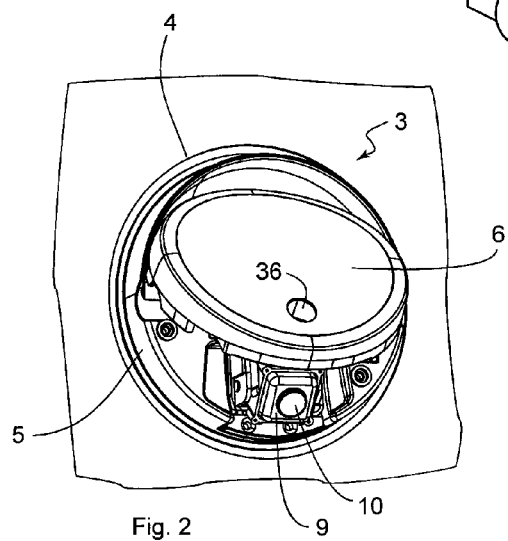
FIG. 2 shows a perspective view of the assembly, in which a carrier housing is disposed in an opening in an exterior paneling of the vehicle, and in which a protective lid is located in an open position.
Figure 6:
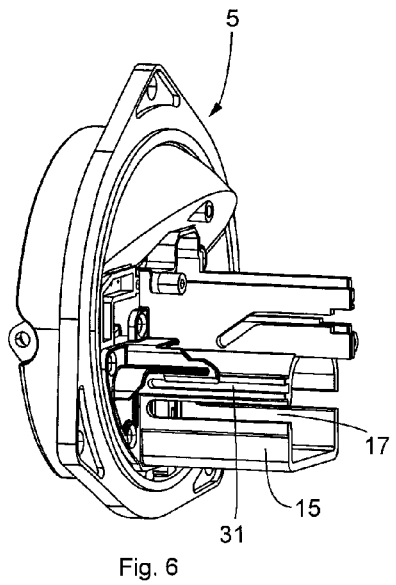
FIG. 6 shows a perspective depiction of the housing components of the assembly according to the invention.
Figure 16:
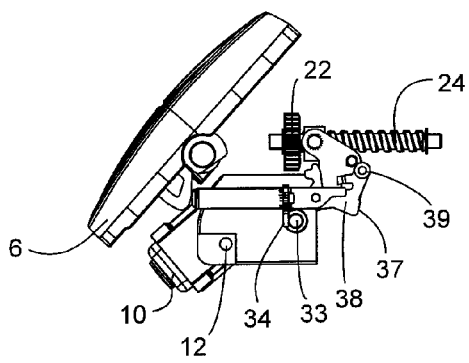
FIG. 16 shows the assembly according to the invention, with the camera unit positioned in an active position, in two depictions showing different components of the assembly.
Figure 16:
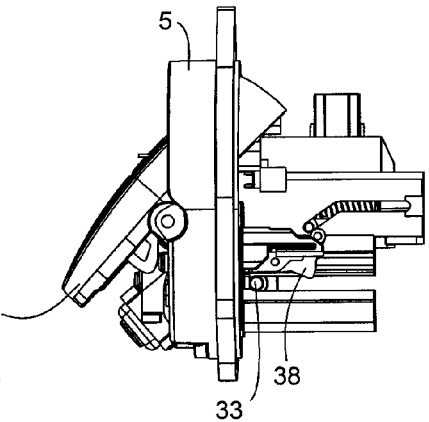

The camera unit 8 can move between a standby position and the active position (see FIG. 16). For this purpose, an accommodating housing 15 attached to the carrier housing 5 extends in the extension of the through-hole 7, as can be seen, for example, in FIG. 6 and FIG. 8. A movement space 18 is provided in the accommodating housing 15, which adjoins the through-hole 7, and in which the camera unit 8 is supported such that it can be displaced, at least between its active position and standby position. The movement of the camera unit 8 is guided thereby with the aid of pin elements 16, which extend outward from both sides of the camera housing 11. The pin elements 16 are received in corresponding, complementary guide grooves 17 formed in the accommodating housing 15, and can be moved in the guide grooves 17. The guide grooves 17 extend along the movement space 18, substantially horizontally, away from the carrier housing 5, or to the carrier housing 5, such that a linear movement of the camera unit 8 to and from the through-hole 7 is ensured. Instead of pin elements 16 on both sides of the camera housing 11, it is sufficient when the camera unit 8 has at least one pin element 16, which is movably guided in a complementary guide groove 17 in the accommodating housing 15. Because the movement space 18 of the camera housing 11 directly adjoins the through-hole 7, it is possible that when the camera unit 8 is disposed in the active position, the lens 10 of the camera 9 protrudes outward from the through-hole 7 of the carrier housing 5, and is oriented such that it is tilted in relation to the movement direction 19 (see, by way of example, FIG. 14) of the camera unit 8, or the camera housing 11, respectively, as is shown, for example, in FIG. 16, wherein the manner in which the lens 10 of the camera 9 protrudes out of the through-hole 7 of the carrier housing 5 is likewise shown in FIG. 2. FIGS. 2, 4, and 16 thus show the active position of the camera unit 8. When the camera unit 8 is in the active position, the vehicle 1 is being driven in reverse. Moreover, when in the active position, the tilted camera 9 serves as an aid for parking, and then films the region in front of the bumper of the vehicle 1 that cannot be seen by the vehicle driver, and displays the recorded images on a monitor in the interior of the vehicle for the vehicle driver, when the driver moves the vehicle 1 backwards. It should be noted that the carrier housing 5 and the accommodating housing 15 in the depicted exemplary embodiment are designed as two separate parts, but a single-piece design would also be a possibility, such that the accommodating housing 15 need not be screwed onto the carrier housing 5.

Figure 7:
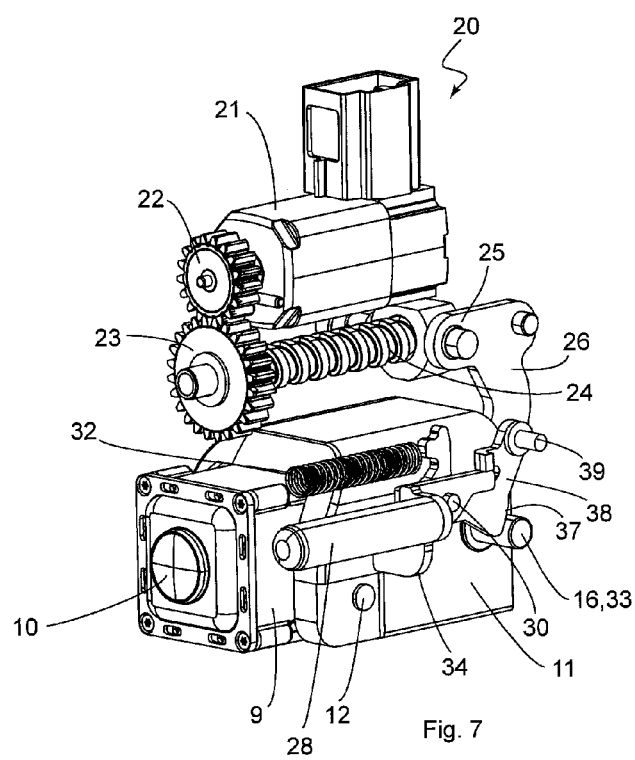
FIG. 7 shows an enlarged and perspective front view of a camera unit and drive unit of the assembly.

The camera unit 8 is moved inside the accommodating housing 15 by means of a drive unit 20, and comprises, in reference to FIG. 7, an electric motor 21, a first gearwheel 22, a second gearwheel 23, and a worm screw 24, wherein the electric motor 21 drives the first gearwheel 22, which meshes with the second gearwheel 23, which in turn is connected to the worm screw 24 in a rotatably fixed manner. Generally speaking, the drive unit 20, attached to the back surface of the carrier housing 5, or attached to the accommodating housing 15, respectively, drives the worm screw 24. The worm screw 24 extends in the movement direction of the camera unit 8, or the camera housing 11, respectively, and is connected in an articulated manner, as well as being movably coupled, to a first end 25 of a lever element 26, such that the lever element 26 can rotate in relation to the worm screw 24 (see FIG. 9, for example). The second end 27 of the lever element 26 is likewise connected in an articulated manner, in this case, however, to the camera unit 8, or the camera 9, more precisely, to the back surface of the camera 9 (see FIG. 9).

The electric motor 21 of the drive unit 20 thus moves the first end 25 of the lever element 26, which is coupled to the camera 9 via its second end 27, which in turn is pivotably supported via the pivot pins 112 in the camera housing 11, such that a movement of the lever element 26 along the worm screw 24 moves the camera unit 8 in the movement space 18 of the accommodating housing 15 in the direction toward and away from the through-hole 7 of the carrier housing 5.

Figure 13:
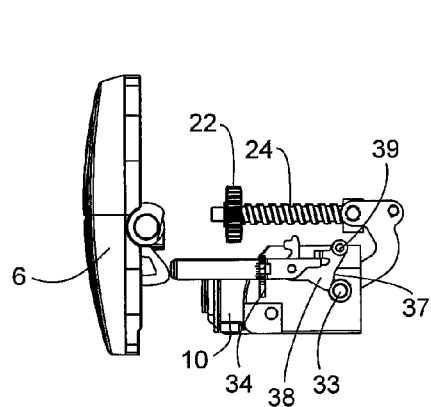
FIG. 13 shows the assembly according to the invention, with the camera unit positioned in a retraction position, in two depictions showing different components of the assembly.
Figure 13:
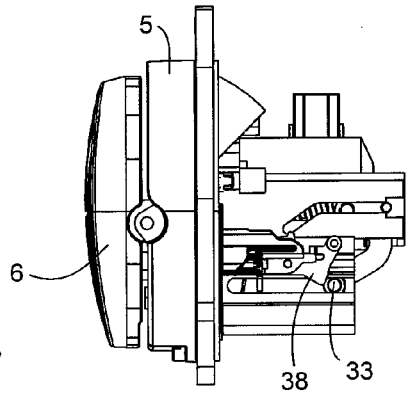

The protective lid 6 is provided in order to protect the camera unit 8 from contaminants, at least in a retracted standby position. The through-hole 7, through which the camera unit 8 passes out of the carrier house 5 when it moves to the active position (see FIG. 2, for example), is closed with the aid of the protective lid 6 (see FIG. 3, 13 or 15, for example), wherein the camera unit 8 is then located in a retracted position. Consequently, in the transition from the retracted position to the active position of the camera unit 8, the protective lid 6 must be moved between its closed position, in which the camera unit 8 is disposed behind the protective lid 6, when seen from the exterior, and its open position.

Figure 10:
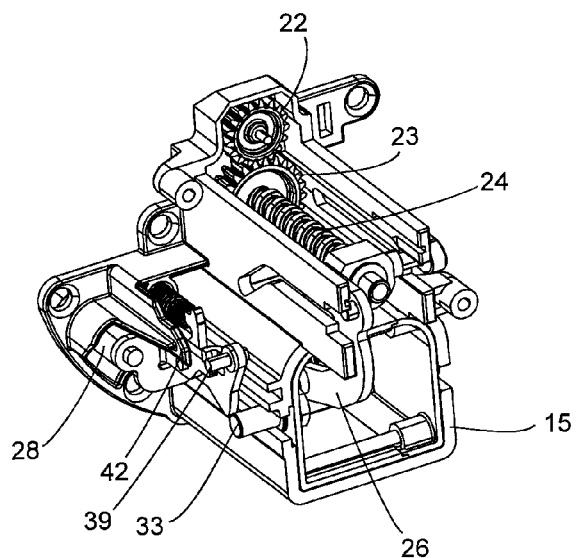
FIG. 10 shows, in a perspective view, a part of the drive unit, a part of the housing component, and the movement mechanics of the assembly according to the invention.
Figure 11:
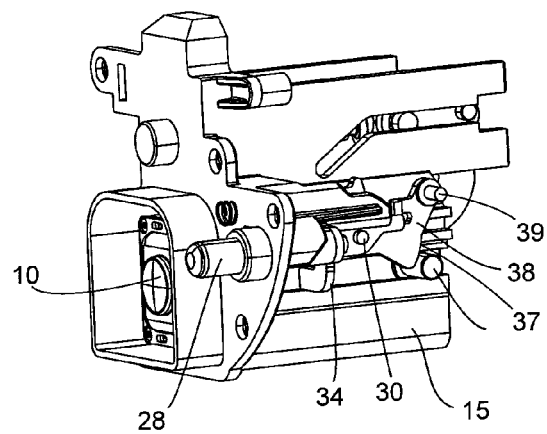
FIG. 11 shows the components from FIG. 10 in another perspective view.
Figure 12:
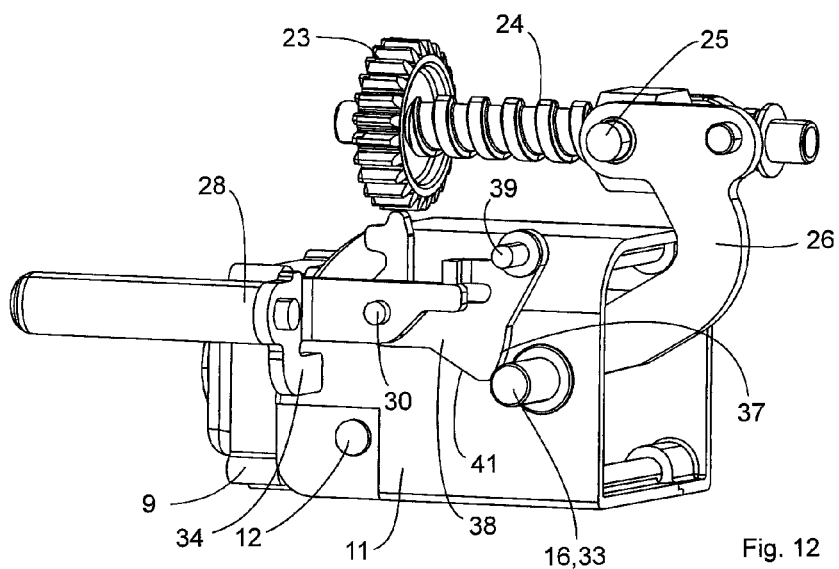
FIG. 12 shows a further exploded view of the camera unit and a part of the drive unit.

In order for the protective lid 6 to be able to be moved, a movement mechanism is provided, which couples the movement of the camera unit 8 to a movement of the protective lid 6. Consequently, the drive unit 20 causes not only a movement of the camera unit 8, but also the protective lid 6, such that there is no need for an additional drive. In order to move the protective lid 6 between its closed position and open position, a push rod 28 is provided in the depicted exemplary embodiment (see FIG. 7 for example). The push rod 28 is movably supported on the accommodating housing 15 parallel to the worm screw 24, wherein a section of the push rod 28 is hidden by a guide opening formed in the direction of the protective lid 6 (see FIG. 8), while a movement pin 30 is formed on the longitudinal end of the push rod 28 facing away from the protective lid 6 (see FIGS. 10, 11 and 12, for example), which is inserted in a guide recess 31. The guide recess 31 is formed in the accommodating housing 15 above the guide groove 17 and parallel thereto (see FIG. 6, for example), such that the guide recess 31 likewise extends toward the protective lid 6. With the aid of the movement pin 30 inserted in the guide recess 31, the push rod 28, the movement of which is additionally guided and oriented by the guide opening 29, can be moved toward and away from the protective lid 6.

The push rod 28 can move against the force of a spring element 32 (see FIGS. 7 and 10, for example), toward the carrier housing 5, wherein the spring element 32 forces the moved push rod 28 away from the carrier housing 5, into a home position. In addition, the push rod 28 must also be moved against the force of a spring element that forces the protective lid 6 into its closed position. In order to move the push rod 28 toward the carrier housing 5, so that the push rod 28 can push the protective lid 6, pivotably supported on the carrier housing 5, from its closed position into its open position, an actuating element 33 is provided, which presses against a first contact surface 34 formed on the push rod 28 and extending substantially perpendicular to the worm screw 24 (see FIG. 12). The actuating element 33 is designed as a control pin 16, and corresponds to the pin element 16 formed on the camera housing 11. The actuating element 33 formed on the camera unit 8 as a control pin 16 is operatively connected to the first contact surface 34 of the push rod 28 movably supported on the carrier housing 5. Because one of the pin elements 16 formed on the side of the camera housing 11 is also the actuating element 33, or the control pin 16, respectively, a movement of the camera unit 8 from a retracted position toward the protective lid 6 causes the control pin 16 to press against the first contact surface 34 of the push rod 28, and the push rod 28 is moved toward the protective lid 28, such that the push rod 28 pivots the protective lid 6 about it bearing axle 35, whereby the protective lid 6 ends up in its open position and the camera 9 is disposed in the active position, in which it protrudes out of the through-hole 7 in the carrier housing 5 (see FIG. 16). The actuating element 33 movably coupled to the drive unit 20 thus forces the protective lid 6 into its open position only when the vehicle 1 is driven in reverse, wherein the camera unit 8 is moved into its active position at the same time.

Figure 15:
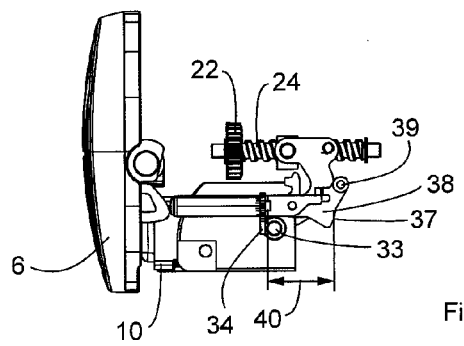
FIG. 15 shows the assembly according to the invention, with the camera unit positioned in a collision monitoring position, in two depictions showing different components of the assembly.
Figure 15:
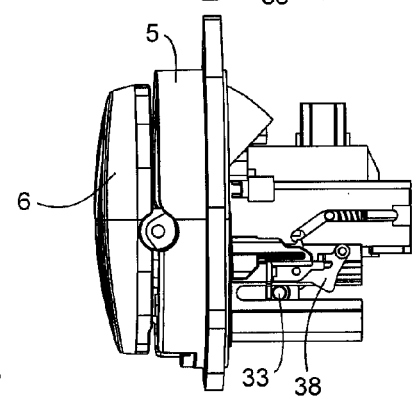

Before the camera unit 8 ends up in the active position it is disposed in a retracted position behind the through-hole 7, which is referred to as the collision monitoring position, and is depicted in FIG. 15. In the collision monitoring position, the protective lid 6 is disposed in its closed position. The camera unit 8 is located directly behind the protective lid 6 and the control pin 16 rests against the first contact surface 34, wherein the lens 10 is oriented in the direction of movement 19 of the camera unit 8 when in the collision monitoring position, and is not tilted in relation to the direction of movement 19, as is the case when the camera unit 8 is in the active position. The collision monitoring position shown in FIG. 15 is assumed by the camera unit 8 when the vehicle 1 is being driven forwards, wherein the camera unit 8 is disposed at a monitoring opening 36 formed in the protective lid 6 (see FIGS. 3 and 5) for recording or filming the (following or proceeding) traffic (see FIG. 15, for example). The monitoring opening 36 is a through-hole formed in the protective lid 6, covered on the outside by a transparent cover, in order that the camera unit 8 disposed behind the protective lid 6 has an unobstructed view outward, while nevertheless no dirt from the exterior can get in.

Consequently, when the camera unit 8 moves from the collision monitoring position to the active position, the control pin 16 rests against the first contact surface 34, and presses the first contact surface 34 toward the through-hole 7, such that the push rod 28 forces, and in particular pivots, the protective lid 6 into its open position in that the push rod 28 pushes against the protective lid 6 at a spacing to its bearing axle 35.

In the active position and the collision monitoring position, the camera unit 8 is active, and films. The camera unit 8 can also assume positions, however, that are disposed at a greater spacing to the protective lid 6 than the collision monitoring position shown in FIG. 15. In other words, the camera unit can assume further retracted positions. One such position is a comfort position, for example, shown in FIG. 14, and serving for an illumination of the area in front of the vehicle 1, wherein the protective lid 6 is disposed in its open position when in the comfort position.

Figure 14:
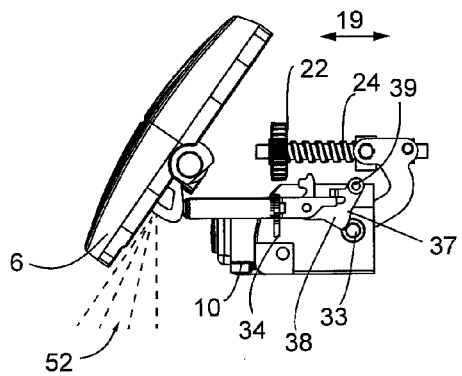
FIG. 14 shows the assembly according to the invention, with the camera unit positioned in a comfort position, in two depictions showing different components of the assembly.
Figure 14:
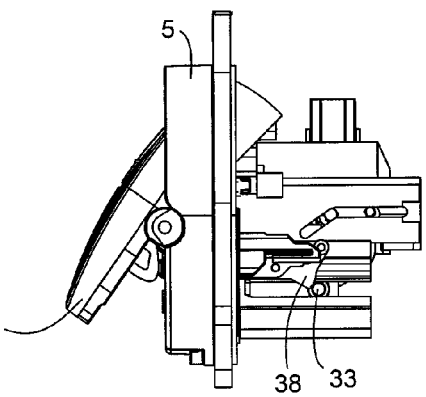

As can be seen in FIG. 14, when in the comfort position, the control pin 16, or the actuating element 33, respectively, no longer rests against the first contact surface 34. Instead, the control pin 16 then rests against a second contact surface 37 formed on a spacer 38. The spacer 38, in turn, is rotatably supported via the movement pin 30 on the longitudinal end of the push rod 28 facing away from protective lid 6, as is visible, for example, in FIGS. 10, 11 and 12. The movement pin 30 thus serves not only as a guide for the push rod 28, but also functions as a rotational axle for the spacer 38 at the same time. The spacer 38 also has a return pin 39 (see FIG. 11 or 12, for example). The second contact surface 37 is disposed at a spacing 40 (see FIG. 15) to the first contact surface 34. The spacing 40 enables the camera unit 8 to be able to be disposed in a retracted position (comfort position) behind the through-hole 7 when the push rod 28 forces the protective lid 6 into the open position. The comfort position serves to provide a lighting of the region in front of the vehicle 1, as explained above. The lighting necessary for this is disposed on the inside of the protective lid 6, protected therein, such that an extended camera unit 8 would interfere with the lighting and would be disposed in the light path of the illumination. The comfort position is provided for this reason, in which position the actuating element 33 designed as the control pin 16 rests against the second contact surface 37 of the spacer 38, and the second contact surface 37 pushes toward the through-hole 7 such that the push rod 28 forces the protective lid 6 into its open position. The camera unit 8 assumes a retracted position thereby, and vacates the region beneath the protected lid 6 that is pivoted open, in order that light can be projected outward without interference, as is indicated by the broken lines 52 in FIG. 14.

The comfort position can only be assumed by the camera unit 8 if it has been previously moved to a position lying behind the comfort position itself. In other words, the camera unit 8 must first be moved a little bit behind the comfort position, in order that the control pin 16, or the actuating element 33, respectively, can be moved from its position disposed between the first contact surface 34 and the second contact surface 37, to a position lying behind the second contact surface 37 in relation to the protective lid 6. For this purpose, the camera unit 8 is moved by the drive unit 20 away from the protective lid 6, out of the comfort position, into a retraction position, depicted in FIG. 13. With this movement, the control pin 16 moves away from the first contact surface 34. A guide surface 41 of the spacer 38, running at an angle to the worm screw 24 (see FIG. 12, for example) rests against the actuating element 33, or control pin 16, respectively, such that when the camera unit 8 is moved backward, away from the protective lid 6, the control pin 16 ends up in contact with the guide surface 41. Due to the rotatable support of the spacer 38, when the control pin 16 is moved further backward, it pushes the spacer 38 upward, and thus out of its movement path, until the control pin 16 ends up behind the guide surface 41 at the second contact surface 37. When the guide pin 16 has passed by the guide surface 41, the spacer 38 pivots downward again, and the control pin 16 ends up resting against the second contact surface 37, which adjoins the guide surface 41. Consequently, the comfort position can only be assumed by the camera unit 8 if it has been previously moved to the retraction position, wherein, if the camera unit 8 moves away from the protective lid 6, from the collision monitoring position to the retraction position, the control pin 16 pushes the spacer 38 out of its movement path, such that the control pin 16 rests against the second contact surface 37. When the camera unit 8 moves from the retraction position toward the comfort position, the control pin 16 rests against the second contact surface 37 of the spacer 38, and pushes the second contact surface 37 toward the through-hole 7, such that the push rod 28 forces the protective lid 6 into its open position, when the camera unit 8 arrives at its comfort position, as is shown in FIG. 14. On the whole, the camera unit 8 is thus movably supported between the active position and the retraction position. When the camera unit 8 is in the retraction position, it is disposed further away from the protective lid 6 than when it is in the collision monitoring position, wherein, when in the comfort position, the camera unit 8 is disposed between the collision monitoring position and the retraction position, which can also be a standby position. The retraction position or the collision monitoring position can be the standby position thereby, in which the protective lid 6 is, in any case, disposed in its closed position and protects the camera unit 8 against access from the exterior.

Figure 24:
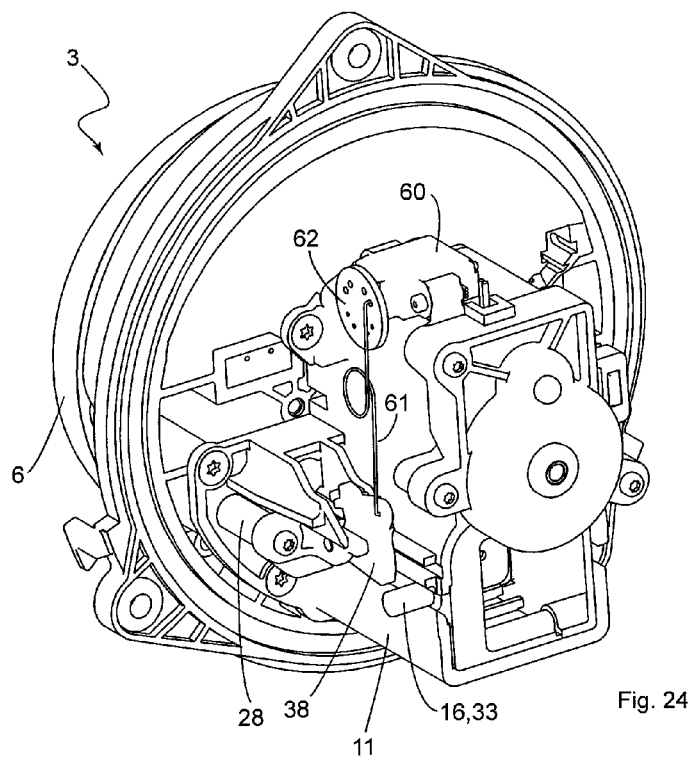
FIG. 24 shows the assembly according to the invention, with an additional drive device.
Figure 25:
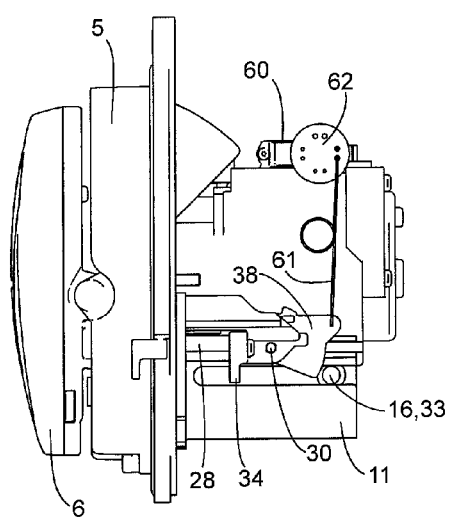
FIG. 25 shows the assembly from FIG. 24, in a side view, with the camera unit in the retraction position, and a spacer in its actuation position.
Figure 26:
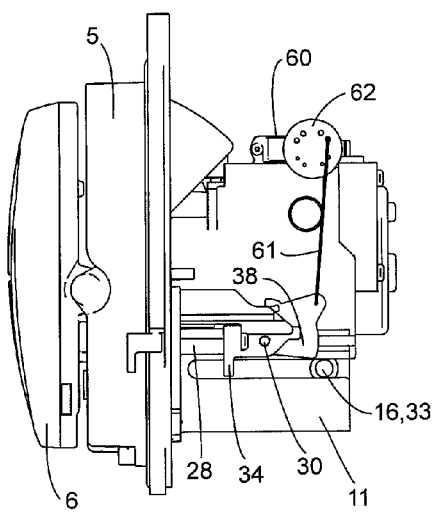
FIG. 26 shows the assembly from FIG. 24 in a side view, with the camera unit in the retraction position and the spacer in its standby position.

In order for the camera unit 8 to be able switch from the comfort position, in which the protective lid 6 is disposed in its open position, back into the collision monitoring position, in which the protective lid 6 is disposed in its closed position, the control element 16 must be moved away from the second contact surface 37 to the first contact surface 34. The return pin 39 is provided for this change, which pin is disposed on the spacer 38 and lies above the control pin 16, when the control pin 16 rests against the second contact surface 37. When the camera unit 8 is moved from the comfort position toward the collision monitoring position, or toward the protective lid 6, respectively, the return pin 39 ends up in contact with a housing guide 42 (see FIG. 10), which moves the return pin 39 away from the control pin 16, this being possible due to the rotatable support of the spacer 38. Because of the pivoting, the spacer 38 ends up out of the linear movement path of the control pin 16, such that the control pin 16 ends up in front of the second contact surface 37, in relation to the protective lid 6, and in contact with the first contact surface 34. In other words, the housing guide 42 guides the return pin 39, when the camera unit 8 moves toward the protective lid 6, away from the comfort position into the collision monitoring position, such that the second contact surface 37 moves the spacer 38 out of the movement path of the control pin 16, and the control pin 16 comes in contact with the first contact surface 34. The disadvantage with this, however, is that the spacer 38 is pushed abruptly downward, and the push rod 28 is likewise pushed abruptly toward the retraction position, when the spacer 38 is forced out of the movement path of the control pin 16 by the return pin 39, because the force of the spring element 32 and the force of the spring forcing the protective lid 6 into the closed position act on these components. The abrupt and jolting movement of the spacer 38 and push rod 28 generates an undesired noise thereby, which can be prevented by the measure illustrated in FIGS. 24, 25 and 26. The assembly 3 is supplemented with a drive device 60, which is attached to the camera housing 11 in the depicted exemplary embodiment. Alternatively, the drive device 60 could also be attached to the carrier housing 5. Moreover, the drive device 60 can be a servomotor or a solenoid, which is coupled in a controlling manner to the drive for the drive unit 20 of the camera unit 8. Depending on the position of the camera unit 8, the drive device 60 is set in operation in order to move the second contact surface 37 of the spacer 38 out of the movement path of the control pin 16, i.e. the actuating element 33, as is illustrated in FIG. 26, while, on the other hand, the drive device 60 in FIG. 25 disposes the spacer 38 in the movement path of the actuating element 33. With the aid of the movement and control coupling, the drive device 60 moves the second contact surface 37 out of the movement path of the control pin 16, when the camera unit 8 moves toward the protective lid 6, from the comfort position into the collision monitoring position. The movement coupling comprises a coupling element 61, which connects the drive device 60 to the spacer 38 such that the spacer 38 can be pivoted about the movement pin 30 of the push rod 28. A rotational movement is generated by the drive device 60, which is transferred to a disk element 62. The coupling element 61 is attached at a first end to the disk element 62, at a point offset radially to the center of the disk element, wherein the other end of the coupling element 61 is attached to the spacer 38. A driving movement of the drive device 60 rotates the disk element 62 from the position shown in FIG. 25 into the position shown in FIG. 26, by means of which the first end of the coupling element 61 ends up at the top, with respect to FIGS. 25 and 26, thus moving the spacer 38 upward and out of the movement path of the actuating element 33. The drive device 60 prevents jolting or abrupt movements of the push rod 28 and the spacer 38, such that undesired noises cannot occur, as is the case, for example, with the embodiment having return pins 39 (see FIG. 12, for example). Moreover, the spacer is then only disposed with its second contact surface 37 in the movement path of the actuating element 33 when the protective lid 6 is positioned for the comfort position, having the lighting for the region in front thereof, and is to be disposed in the open position. A jolting or abrupt springing back of the push rod 28 is prevented with the aid of the drive device 60.

Based on the construction describe above, the camera unit can be moved sequentially from the active position, through the collision monitoring position and through the comfort position, into the retraction position, wherein the collision monitoring position or the retraction position can be considered as the standby position, in which the protective lid 6 is disposed in its closed position. Conversely, in both the comfort position as well as in the active position, the protective lid 6 is disposed in the open position, such that these positions are not suited to function as the standby position.

Figure 17:
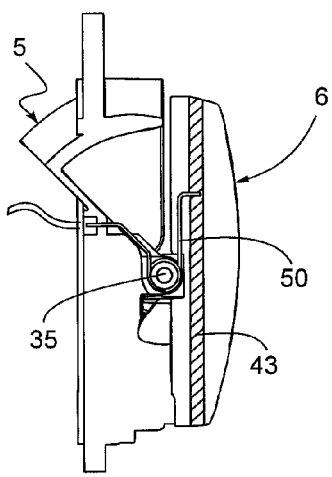
FIG. 17 shows a side, sectional view of a carrier housing and the protective lid in the closed position, of the assembly according to the invention.
Figure 18:
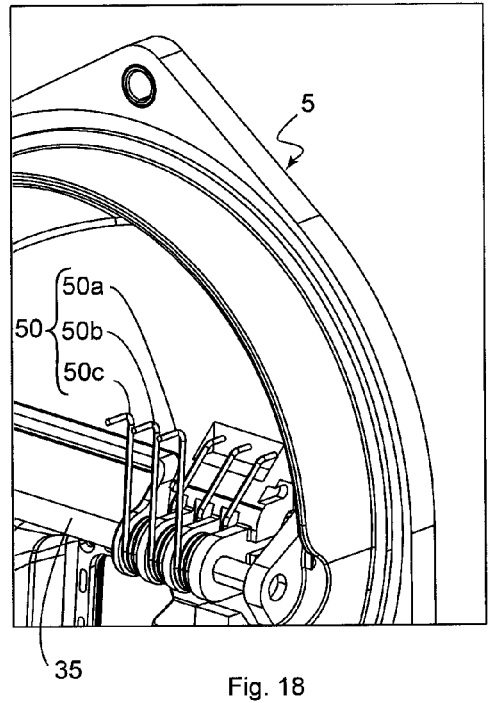
FIG. 18 shows a perspective exploded view of the protective lid.
Figure 19:
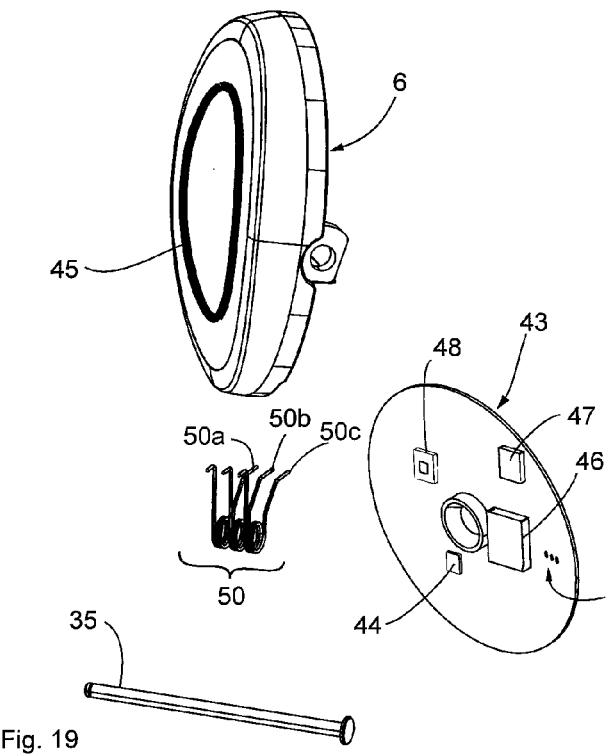
FIG. 19 shows an enlarged and perspective front view of the carrier housing, without the protective lid attached.

The protective lid 6 is depicted in greater detail in FIGS. 17, 18 and 19, wherein it can be seen from the sectional view in FIG. 17 that the protective lid designed in the shape of a cover has a printed circuit board 43, depicted in detail in FIG. 19. A capacitive sensor is disposed on the printed circuit board 43 integrated in the protective lid 6, designed as a proximity sensor 46, for detecting the approach of a user body part, and an LED is mounted on the surface, serving as a light source 44 for lighting the vehicle make emblem 45 (depicted simply as a circular emblem on the protective lid in FIG. 19) or the region in front of the assembly 1. Furthermore, the printed circuit board 16 [sic: 43] has a control and evaluation device 47, coupled to the proximity sensor designed as a capacitive sensor and/or the light source 44 designed as an LED. Lastly, a micro-switch 48, depicted by a broken line in FIG. 19, is disposed on the lateral surface of the printed circuit board 43 facing away from the light source 44, which can register a manual actuation of the protective lid 6 designed as a handle, when this micro-switch strikes against the wall of an accommodating chamber 49 of the carrier housing 5 (see FIG. 5) when actuated.

The protective lid 6, which can also be designed as a handle, is retained in its closed position by a spring element 50. In the depicted exemplary embodiment, the spring element 50 comprises three coil springs 50a, 50b, 50c, which are slid over the bearing axle 35 of the protective lid 6, and are disposed at a spacing to one another, as can be seen, by way of example, in FIG. 18.

The exemplary embodiment shown in the Figures thus provides an assembly of a camera unit 8 in combination with a protective lid 6 designed as a handle, which illuminates a vehicle make emblem 15 and offers the user a device that is readily locatable and easy to actuate. The user can execute both a manual actuation of the protective lid 6, or handle, respectively, by means of its pivoting, as well as a proximity actuation, which is registered by the proximity sensor 46. The control and evaluation device 47 can activate the light source 44 as a function of the actuations. The light source 44 can thus be activated as a function of the mechanical or manual actuation of the protective lid 6 designed as a handle, which is registered and detected by the micro-switch 48, and also by the proximity detection by means of the proximity sensor 46. In order to transfer energy and data to and from the printed circuit board 43, the spring element 50 disposed between the protective lid 6 and the carrier housing 5 is designed to be electrically conductive. In particular, the three coil springs 50a, 50b, 50c defining the spring element 50 are manufactured from an electrically conductive material, such as a copper wrought alloy for example. The electrically conductive spring element 50 provides an electrical connection of the printed circuit board 43 to a vehicle-side conducting element, and furthermore, exerts a return force that forces the protective lid 6 into the closed position.

In the following, a process for operating the assembly 3 according to the present invention shall be described with reference to FIGS. 20, 21, 22 and 23. The process uses the so-called polling method, in which the status thereof is queried on a cyclical basis.

Figure 20:
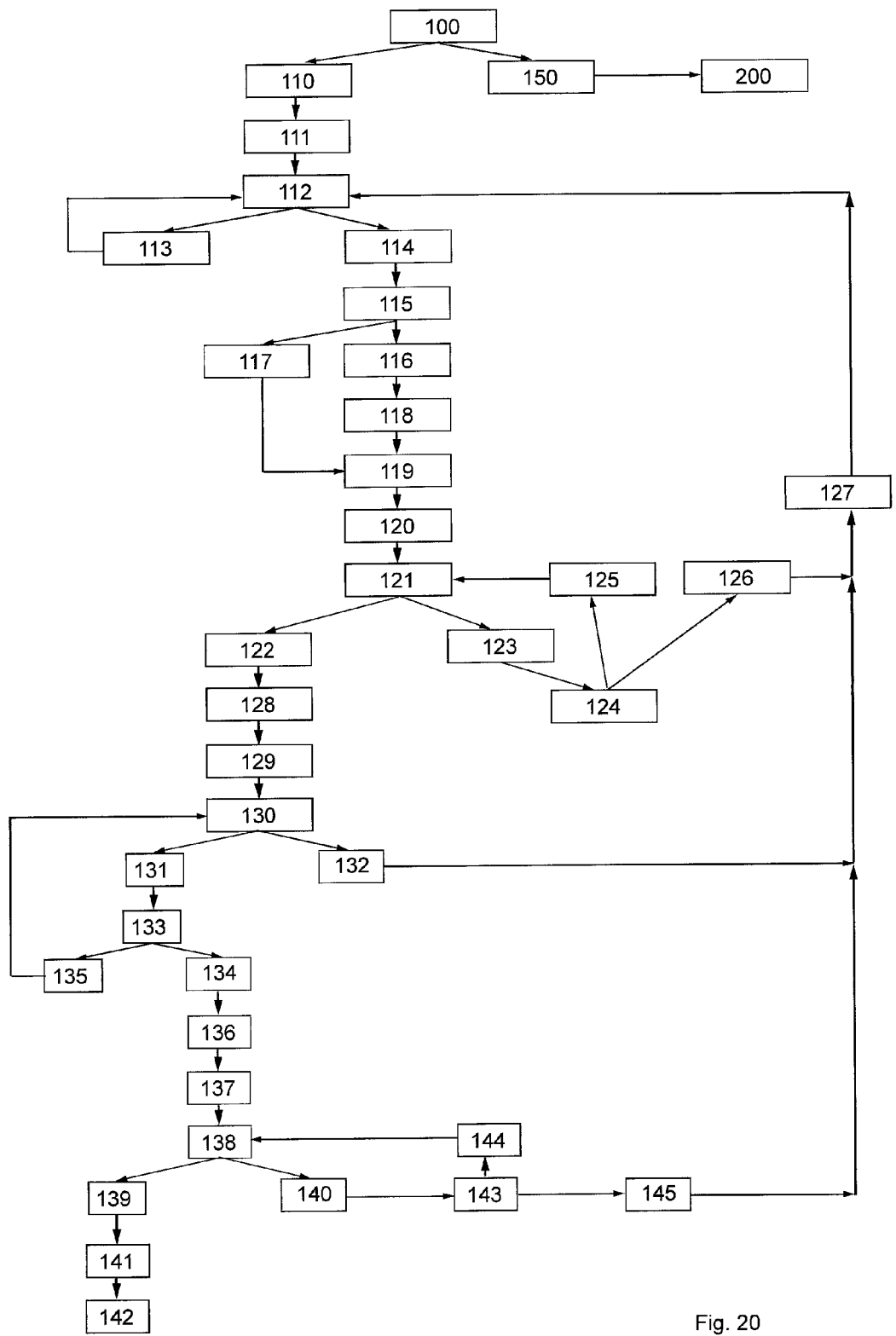
FIG. 20 shows a process design for operating the assembly according to the invention.
Figure 21:
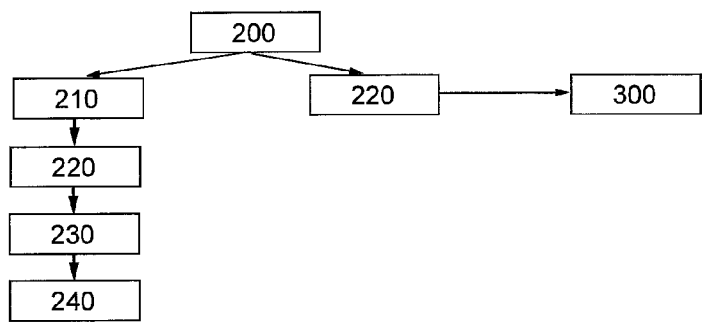
FIG. 21 shows another process design for operating the assembly according to the invention.

In reference to FIG. 20, it is checked in the process, in step 100, whether the vehicle 1 is parked and/or the ignition of the vehicle 1 is shut off. If the vehicle 1 is moving, the process determines this in step 150, and continues at step 200 (see FIG. 21), as shall be described in detail below. When the vehicle is parked and/or the ignition is off, as determined in step 110, the process progresses to step 111. It is checked in step 111 whether the camera unit 8 is disposed in the standby position, or the retraction position, respectively. If this is not the case, the camera unit 8 is moved accordingly into the retraction position in step 111. In step 112, the assembly 3, preferably the proximity sensor 46 or a receiver, checks whether a valid access code has been emitted from an ID provider, in order to open the doors of the vehicle 1. If no access code has been received, which is determined in step 113, the process returns to step 112, and continues checking cyclically, until an access code is received, which is determined in step 114. It then goes from step 114 to step 115 in the process, where the lighting conditions of the exterior are checked. If it is dark, which is determined in step 116, then the camera unit 8 is moved to the comfort position in step 118, in which the protective lid 6 is open, and the light source 44 is switched on. If it is light outside, however, which is determined in step 117, then step 118 is skipped. Thus, step 119 follows either step 117 or step 118, in which the proximity sensor 46 is switched on, in order to detect a body part of a user. After the proximity sensor 46 has been switched on, a timer is switched on in step 120. It is then checked in step 121 whether a body part of a user is guided into the proximity of the proximity sensor 46. If this is not the case, which is determined in step 123, it is then checked in step 124 whether a predefined time interval has been exceeded. If the time interval has been exceeded, which is determined in step 126, the process advances to step 127, in which the proximity sensor 46, and if applicable, the light source 44, are switched off, and the protective lid 6 is moved back to its closed position, before advancing to step 112. If, however, the predefined time interval is not exceeded, which is determined in step 125, the process continues at step 121. If the process determines in step 122 that a body part is moved into the proximity of the proximity sensor 46, the process switches to step 128, in which the company emblem 45 is illuminated, in order to show the user optically that the proximity is detected by the assembly. The process then advances to step 129, in which another timer is switched on. It is then checked in the subsequent step 130, whether the body part is still in the proximity. If this is not the case, which is determined in step 132, the process then switches to step 127, which has been described above, before it then advances to step 112. If, however, it is determined in step 131 that the body part is still in the proximity of the proximity sensor 46, then another predefined time interval is checked in step 133. If the other predefined time interval has not yet lapsed, which is determined in step 135, the process returns to step 133. If however, the body part remains disposed in the proximity of the proximity sensor 46 for the further predefined time interval, which is determined in step 134, the process switches to step 136, in which the company emblem is illuminated cyclically, so that it blinks. After step 136, step 137 is initiated, in which another timer is started. It is then checked in step 138 whether the body part of the user is in the proximity of the proximity sensor 46. If the body part is no longer in the proximity, which is determined in step 139, then the proximity sensor 46 and the light source 44 are switched off in the following step 141, the protective lid 6 is closed, and the lid 2 of the vehicle 1 is opened. If, however, the body part is still in the proximity of the proximity sensor 46, which would indicate a coincidental and unintentional proximity, this is detected in step 140. It is then checked in the subsequent step 141 whether this situation remains for the further predefined time interval. If this is not the case, the process switches via step 144 to the previous step 138. If however, the further predefined time interval has been exceeded, which is determined in step 145, the process switches to step 127, as already described above.

The process version above relates to the case where the vehicle is stationary. When the vehicle 1 is in motion, however, which is determined by the process in step 150, the process continues at step 200, which shall be explained in greater detail below, in reference to FIG. 21. The process checks in step 200 whether a reverse gear is engaged. If this is not the case, which is determined in step 220, the process switches to step 300, which shall be explained below in reference to FIGS. 22 and 23. If, however, it is determined in step 210 that a reverse gear is engaged, the camera unit 8 is moved into the active position (see FIG. 16) in step 220, and in the subsequent step 230, an image transmission to the interior of the vehicle occurs. The subsequent step 240 represents the process version known from the prior art in this case, such that no further explanation thereof is needed.

Figure 22:
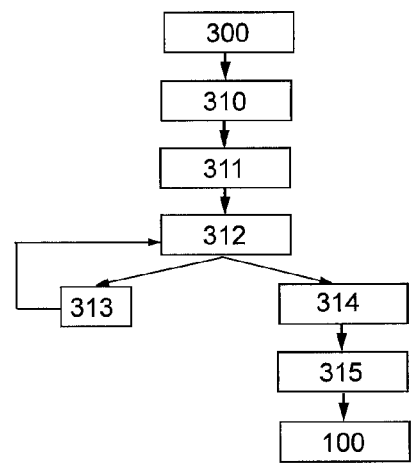
FIG. 22 shows yet another process design for operating the assembly according to the invention.

If however, the vehicle is in motion, and no reverse gear is engaged, which is determined in step 220, the process switches to step 300. FIG. 22 shows one possible process sequence for step 300 and its subsequent steps, while FIG. 23 provides an alternative to the process sequence depicted in FIG. 22.

In reference to FIG. 22, after step 300, the camera unit 8 is moved into the collision monitoring position in step 310, in order to film the (following or preceding) traffic. According to the method, the camera unit 8 begins to record images and/or displays images of the filmed region in step 311. It is then checked in step 312 whether the vehicle 1 is again parked. If it is not parked, which is determined in step 313, the process returns to step 312, and filming continues. If however, the vehicle 1 is actually parked, this is determined instep 314, at which point the camera unit 8 is moved to the standby position in step 315, and the process returns to step 100.

Figure 23:
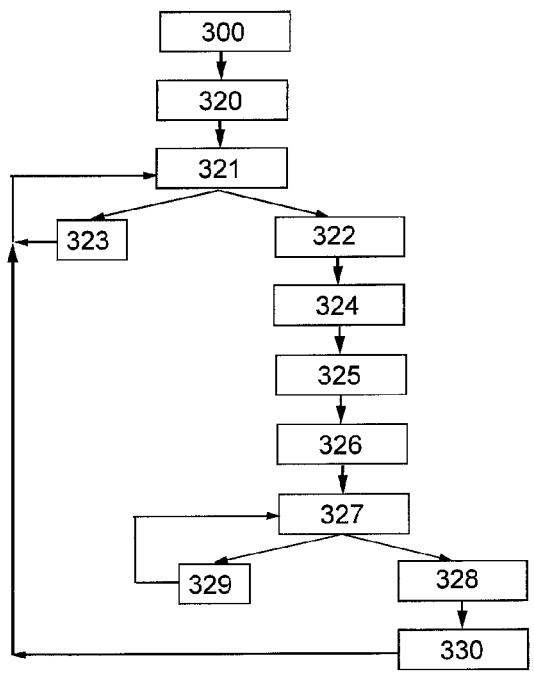
FIG. 23 shows an alternative process design for operating the assembly according to the invention.

A process diagram is depicted in FIG. 23, which could be used as an alternative to the process sequence described in FIG. 22. In step 320, the camera unit 8 remains in the standby position, wherein it is checked in step 321 whether a pre-crash warning is present. If this is not the case, which is determined by the process in step 323, then the process returns to step 321. If however it is determined in step 322 that a pre-crash warning is present, a timer is switched on in step 324, and the camera unit 8 is moved to the collision monitoring position in the following step 325, whereupon, in step 326, a storage of the filmed image material occurs, in a black box for example, in order that the film data can be evaluated at a later point in time, and a possible accident can be reconstructed. Subsequently, the time interval initiated by the timer is evaluated in step 327. If a predefined time interval has not yet been exceeded, which is determined in step 329, then the process returns to step 326. If however, the predefined time interval has lapsed, which is determined in step 328, then process step 300 follows, in which the camera unit 8 is returned to the standby position, before the process then switches back to step 321.

The invention described above is, as a matter of course, not limited to the described and depicted embodiment. It is apparent that numerous changes, obvious to the person skilled in the art, regarding the intended use, can be made to the embodiment depicted in the drawings, without abandoning the scope of the invention thereby. Everything contained in the description and/or depicted in the drawings, including that which is obvious to the person skilled in the art, deviating from the concrete exemplary embodiment, belongs to the invention.

The invention claimed is:

1. An assembly for a vehicle, having a carrier housing, which is disposed in an opening in an exterior paneling of the vehicle, and which has a through-hole,
    a drive unit, which is attached to a back surface of the carrier housing,
    a movably supported camera unit, which can be moved by the drive unit between at least a standby position and an active position, in which at least a lens of the camera unit protrudes out of the through-hole of the carrier housing, and is oriented such that it is tilted in relation to movement direction of the camera unit,
    a protective lid movably supported on the carrier housing, which can move between a closed position, in which it closes the through-hole of the carrier housing, and in which the camera unit is disposed behind the protective lid, seen from the outside, and an open position, in which it leaves the through-hole of the carrier housing open,
    wherein an actuating element, movably coupled to the drive unit, is provided, which forces the protective lid into its open position when the vehicle is being driven in reverse, and when the camera unit is in the active position,
    wherein the camera unit assumes a collision monitoring position when the vehicle is being driven forwards, in which the protective lid is disposed in its closed position and in which the camera unit is disposed at a monitoring opening formed in the protective lid, for filming the following or preceding traffic, and
    wherein the lens of the camera unit is oriented in the direction of movement of the camera when the camera unit is arranged in the collision monitoring position.

2. The assembly according to claim 1, wherein the camera unit can furthermore be moved between a retraction position and a comfort position, serving to illuminate a region in front of the vehicle, in which the protective lid is disposed in its open position, wherein the camera unit is disposed further away from the protective lid when in the retraction position than when in the collision monitoring position, and wherein the camera unit is disposed between the collision monitoring position and the retraction position when in the comfort position.

3. The assembly according to claim 2, wherein the comfort position can only be assumed by the camera unit when it has previously been moved to the retraction position.

4. The assembly according to claim 1, wherein the actuating element is designed as a control pin on the camera unit, and a push rod that is operatively connected to the protective lid and is movably supported on the carrier housing has a first contact surface, wherein, when the camera unit is moved from the collision monitoring position into the active position, the control pin rests against the first contact surface and the first contact surface pushes toward the through-hole, such that the push rod forces the protective lid into its open position.

5. The assembly according to claim 4, wherein a spacer having a second contact surface is rotatably attached to a longitudinal end of the push rod facing away from the protective lid, wherein the second contact surface is disposed on the side of the first contact surface facing away from the protective lid, and at a spacing to the first contact surface, wherein, when in the comfort position and in the retraction position, the actuating element designed as a control pin rests against the second contact surface of the spacer, and the second contact surface pushes toward the through-hole such that the push rod forces the protective lid into its open position.

6. The assembly according to claim 5, wherein, with a movement of the camera unit directed away from the protective lid, from the collision monitoring position into the retraction position, the control pin pushes the spacer out of its movement path, such that the control pin ends up at the side of the second contact surface facing away from the protective lid, and rests thereon.

7. The assembly according to claim 5, wherein with a movement of the camera unit directed toward the protective lid, from the comfort position into the collision monitoring position, a housing guide guides a return pin attached to the spacer, such that the second contact surface of the spacer moves out of the movement path of the control pin, and the control pin comes into contact with the first contact surface.

8. The assembly according to claim 5, wherein a drive device is movably coupled to the spacer, and its second contact surface moves out of the movement path of the control pin when the camera unit moves toward the protective lid, out of the comfort position into the collision monitoring position.

9. The assembly according to claim 8, wherein the drive device is attached to the carrier housing or the camera housing, and a coupling element connects the drive device to the spacer, such that the spacer can be pivoted about a movement pin of the push rod.

10. The assembly according to claim 8, wherein the drive device can be a servomotor or a solenoid, with which drive of the drive unit the camera unit is controllably coupled.

11. The assembly according to claim 1, wherein an accommodating housing attached to the carrier housing extends in the extension of the through-hole, in which the camera unit is supported such that it can be moved at least between its active position and standby position.

12. The assembly according to claim 11, wherein the camera unit includes has at least one pin element, which is movably guided in a complementary guide groove in the accommodating housing.

13. The assembly according to claim 2, wherein the standby position corresponds to either the collision monitoring position or the retraction position.

14. The assembly according to claim 4, wherein the push rod can be moved toward the carrier housing against the force of a spring element.

15. The assembly according to claim 1, wherein the protective lid includes a printed circuit board, having a light source for illuminating the region in front of the assembly when the protective lid is in the open position, or for illuminating a vehicle make emblem attached on the outside of the protective lid.

16. The assembly according to claim 1, wherein the protective lid includes a printed circuit board, having a light source for illuminating the region in front of the assembly when the protective lid is in the open position, and for illuminating a vehicle make emblem attached on the outside of the protective lid.

* * * * *